United States Patent
Ling et al.

[15] 3,694,936
[45] Oct. 3, 1972

[54] APPARATUS FOR DETERMINING VISIBILITY INCLUDING A PULSED LIGHT SOURCE, A PLURALITY OF SPACED REFLECTORS, AND A DETECTOR

[72] Inventors: Bernt Ling; Anders Persson; Olof Svensson, all of Vasteras, Sweden

[73] Assignee: Allmanna Svenska Elektriska Atiebolaget, Vasteras, Sweden

[22] Filed: Oct. 21, 1971

[21] Appl. No.: 191,328

[30] Foreign Application Priority Data

Nov. 16, 1970    Sweden .................15470/70

[52] U.S. Cl. ..............................356/208, 250/218
[51] Int. Cl. ..........................................G01n 21/22
[58] Field of Search ......250/218; 356/4, 5, 103, 207, 356/208, 205

[56] References Cited

UNITED STATES PATENTS 3,393,321    7/1968    Frungel .....................356/4

*Primary Examiner*—Ronald L. Wibert
*Assistant Examiner*—Orville B. Chew, II
*Attorney*—Jennings Bailey, Jr.

[57] ABSTRACT

To determine visibility in varying weather conditions, a light-emitting source is arranged to emit light pulses in the direction of reflectors arranged at known constant distances or with consecutively increasing or decreasing distances between them, the size and reflexibility being unique for each one of them, and a receiving unit of which the amplification can be variable according to the time, is arranged to receive echoes from the reflectors, the number of echoes the amplitude of which exceeds a certain value are registered and counted and the number of echoes actually accepted by the receiver unit constitutes a measurement of visibility.

7 Claims, 3 Drawing Figures

APPARATUS FOR DETERMINING VISIBILITY INCLUDING A PULSED LIGHT SOURCE, A PLURALITY OF SPACED REFLECTORS, AND A DETECTOR

BACKGROUND OF THE INVENTION

1. Field of the Invention

It is extremely important, for example on airfields, to be able continuously to supervise visibility and at the same time to have accurate information as to visibility at any particularly moment.

2. The Prior Art

Many devices have been proposed in order to determine visibility. One such device comprises a number of light sources placed at varying and known distances. Visibility is thus determined by the distance to the furthest light source which is visible at the moment in question. This method is thus dependent on the eyesight of the person carrying out the observation. Another such device comprises a light source which illuminates a reflector arranged a relatively short distance from the light source, and a receiver which measures the intensity of the light reflected from said reflector. If visibility deteriorates, the intensity diminishes. One disadvantage with this method is that the distance between emitter and reflector must be short since this distance is the least which can be measured. Another disadvantage is that a local disturbance, for example a bank of mist across the short measuring distance, is recorded as a general reduction in visibility.

SUMMARY OF THE INVENTION

The present invention relates to a means for determining visibility in varying weather conditions. In principle the measuring distance can be any length and the measurement is completely automatic and independent of any human judgement.

The invention is characterized by the fact that a light-emitting source is arranged to emit light pulses in the direction of reflectors arranged at known constant distances or with consecutively increasing or decreasing distances between them, the size and reflexibility being unique for each one of them, and a receiving unit, of which the amplification can be variable according to the time, is arranged to receive echoes from the reflectors, the number of echoes the amplitude of which exceeds a certain value are registered and counted and the number of echoes actually accepted by the receiver unit constitutes a measurement of visibility.

BRIEF DESCRIPTION OF THE DRAWINGS

The device according to the invention will be further described with reference to the accompanying drawings in which.

DESCRIPTION OF THE PREFERRED EMBODIMENTS

Figure 1:
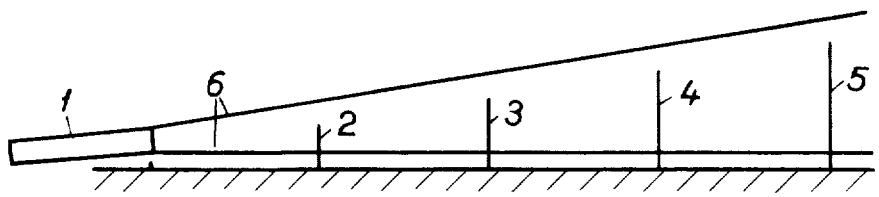
FIGS. 1 and 2 show schematically in vertical and horizontal planes, respectively, how a radiation source is arranged to illuminate a number of reflectors arranged one after the other

FIG. 1 shows a light-emitting radiation source 1 which may comprise, for example, a laser emitter. A laser emitter is often to be preferred on airfields since, as is known, it emits a relatively narrow light beam 6 and is thus less disturbing to the surroundings. The light beam 6 of the radiation source 1 should, however, be of such size that all the reflectors 2, 3, 4 and 5 placed in its path are well and fully illuminated.

Figure 3:
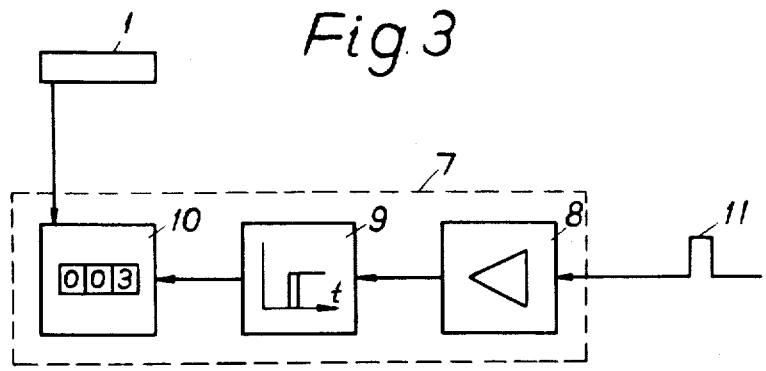
FIG. 3 shows an embodiment of the receiving unit which is a part of the device according to the invention.

The reflectors 2, 3, 4 and 5 are arranged at known distances from the radiation source 1, either with a constant distance between them or with consecutively increasing or decreasing distances between them. The device includes a receiving unit 7, shown in FIG. 3, which comprises an amplifier 8, a level sensing device 9 and a counter 10. The amplification of the amplifier 8 can be variable according to time, so that an echo 11 received at a later moment is amplified more than a previous one. This increase in amplification can be made either linear or non-linear. In the latter case it is suitably determined by an $e$-function.

So that the reflectors will operate as desired, they should be given equal reflecting capacity, but a reflecting surface area which increases with the distance. The increase in the reflecting area is calculated so that the echo reflected from the reflector 3 and received by the receiving unit 7 has the same amplitude as an echo from the reflector 2. According to known optical laws this means that the reflecting surface of the reflectors should thus increase in proportion to the square of the distance. Another way of obtaining the same result is by using reflectors having different reflecting capacity, or reflectivity the reflector furthest away, in the present case number 4, having the greatest reflection capacity. Of course it is also possible to combine these two methods so that with increasing distance, both the reflecting surface and the reflectivity are increased to achieve the desired result. Another method is to vary the degree of amplification of the amplifier as described above. This third method may from the amplifier 8 also be combined with either or both of the first two methods.

The level sensing device 9 in the receiving unit 7 is set so that only the echoes 11 which give an output signal from the amplifier 8 the amplitude of which exceeds a certain value are arranged to induce a pulse to the counter 10 and thus be presented as a distance or be counted in the series of echoes received. The device is suitably adjusted if visibility is good or if some other visibility condition prevails which is called the reference visibility. In this case response signals or echoes, preferably having the same amplitudes, should be obtained.

Figure 2:
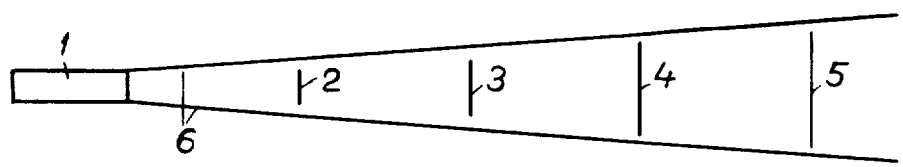

If, for example, a light pulse is emitted from the radiation source 1, the counter 10 obtains a starting pulse 12 from the radiation source 1, after which the counter 10 counts the number of echoes 11 received which have sufficient amplitude, and presents this number. If, for example, the counter 10 has registered three echoes 11 having an amplitude exceeding the predetermined value, this means that visibility with a certain predetermined contrast is at least equal to the distance from the light source 1 to the reflector 4 according to FIGS. 1 and 2. Alternatively the visibility can be measured using, for instance, blocking circuits having a first and a second blocking limit, one reflector at a time being encompassed by said limit and scanned.

As an alternative to the device described here, the response signals 11 may be different and thus vary according to a certain function. It is advisable to process the signals before presentation so that a suitable relationship is acquired between the visibility values presented.

It is also possible to detect discontinuities in visibility, for example a bank of mist, by recording and/or presenting by means of a recorder, for example, the amplitudes of all accepted echoes so that discontinuities can easily be determined as to position and extent.

We claim:

1. Means for determining visibility in varying weather conditions, comprising a radiation source (1), a plurality of reflectors (2,3,4,5) arranged at different distances from the radiation source to receive radiation emitted thereby, a receiving unit (7) including amplifying means (8) arranged to receive echoes of radiation from said source reflected by said reflectors, the reflective surfaces areas and reflectivity of said reflectors and the amplification factor of the receiving unit being so related that at a predetermined reference visibility the output of the amplifying means is the same for echoes from each of the reflectors, the receiving unit including means to emit output signals only in response to signals from said amplifying means exceeding a predetermined value, whereby the number of such output signals determines the visibility.

2. Means according to claim 1, in which the reflectors (2,3,4,5) have substantially equal reflectivity whereas the reflecting surface of each of the reflectors increases with increasing distance between the radiation source (1) and the reflectors (2,3,4,5).

3. Means according to claim 1, in which the reflectivity of the reflectors (2,3,4,5) increases with increasing distance between the radiation source (1) and the reflectors (2,3,4,5).

4. Means according to claim 1, in which the amplification factor of the receiving unit (7) is variable depending on the time.

5. Means according to claim 1, in which said receiving unit (7) comprises members (10) arranged to count the number of echoes (11) accepted by the receiving unit (7).

6. Means according to claim 1, in which the light cross-section of the radiation source (1) is arranged to illuminate the total reflecting surface of all the reflectors (2,3,4,5).

7. Means according to claim 1, in which the radiation source (1) is a laser emitter.

* * * * *